Feb. 11, 1958 J. J. SCHEPPE 2,822,702
SPEED CONTROL
Filed Dec. 8, 1953 2 Sheets-Sheet 1
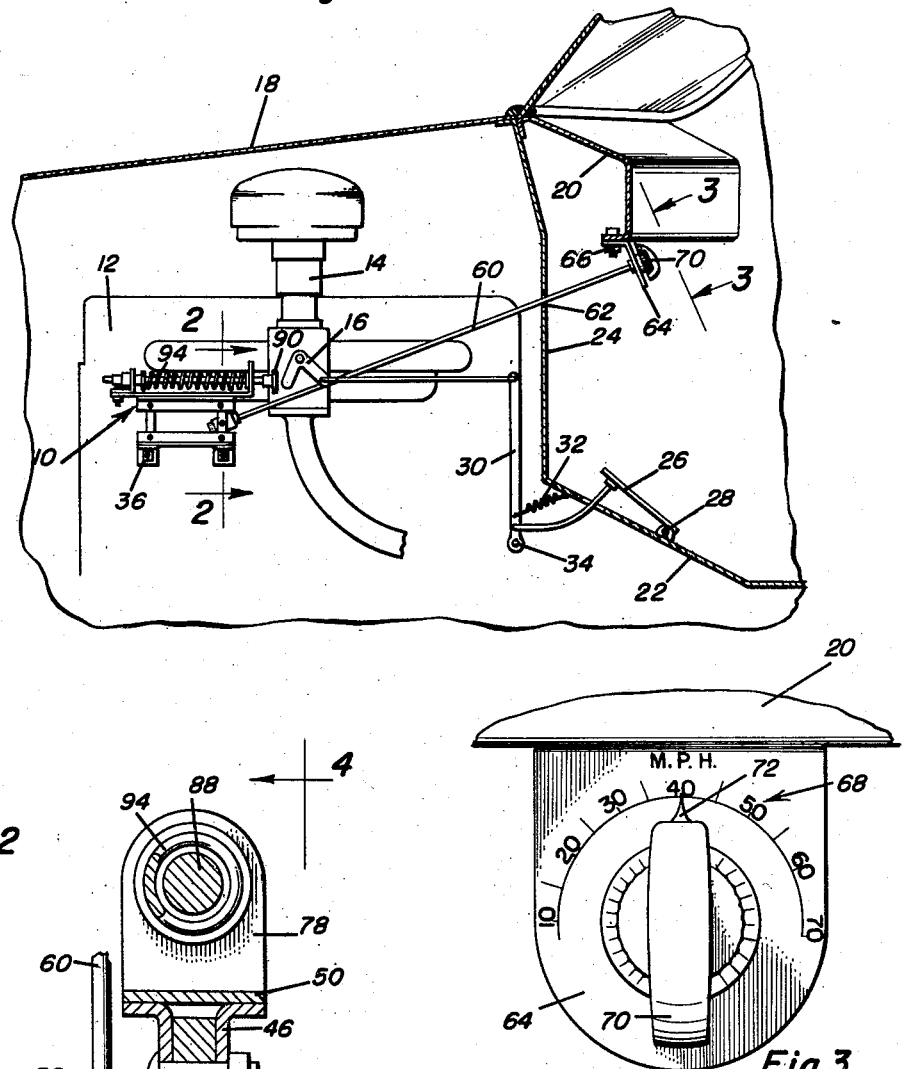
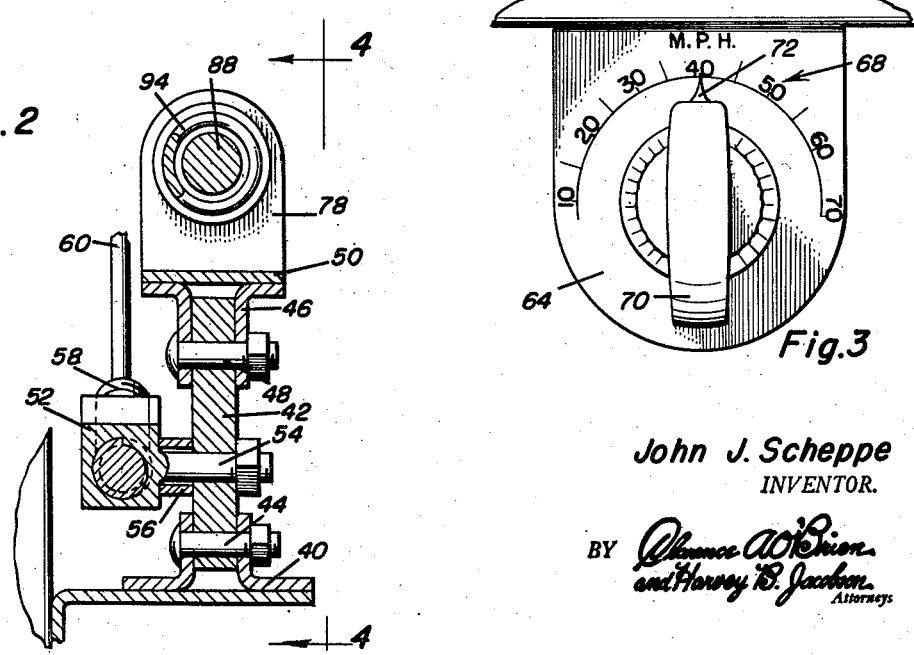
John J. Scheppe
INVENTOR.

Feb. 11, 1958 J. J. SCHEPPE 2,822,702
SPEED CONTROL
Filed Dec. 8, 1953 2 Sheets-Sheet 2
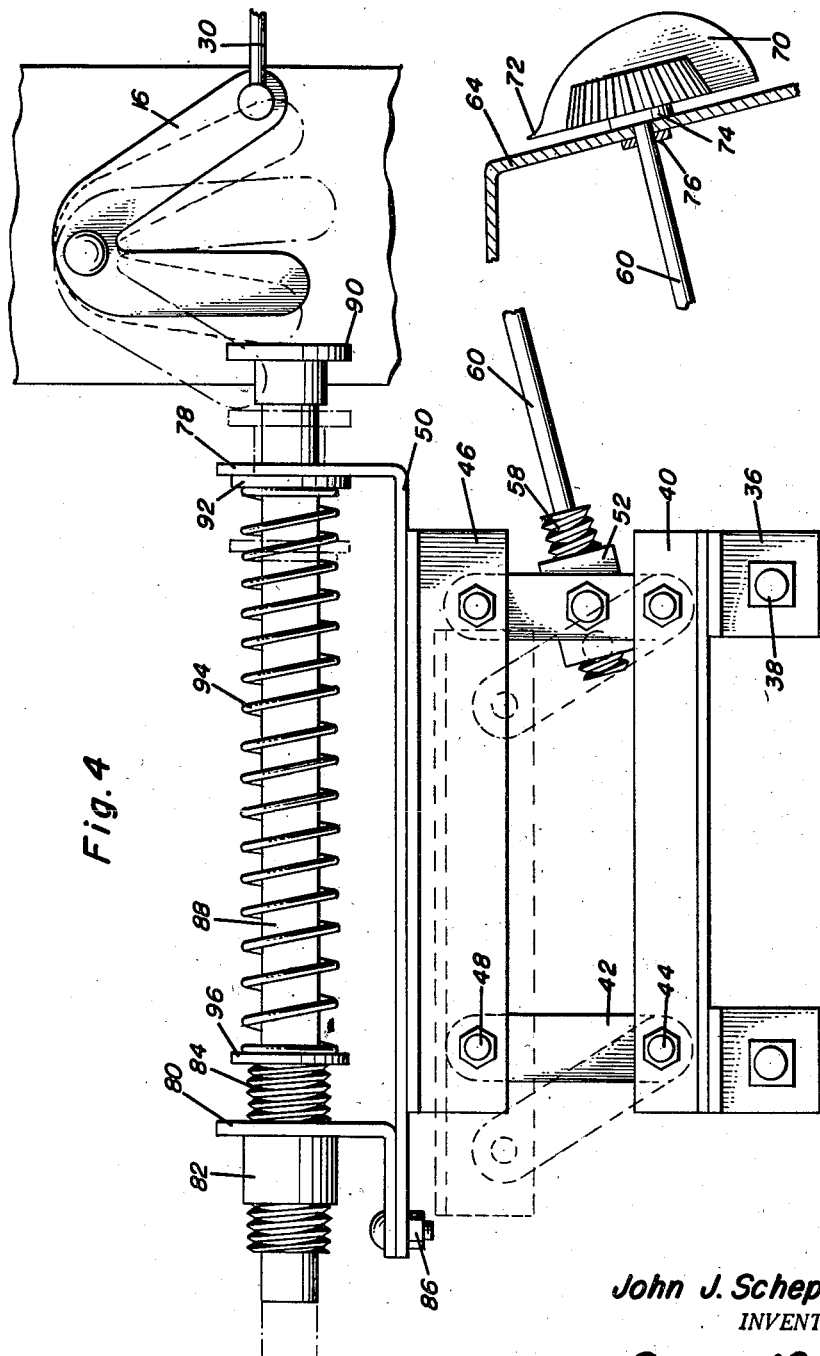
John J. Scheppe
INVENTOR.

United States Patent Office 2,822,702
Patented Feb. 11, 1958

2,822,702

SPEED CONTROL

John J. Scheppe, Trenton, N. J.

Application December 8, 1953, Serial No. 396,914

2 Claims. (Cl. 74—526)

This invention relates to a speed control and is a useful improvement in motor vehicle speed controls and the principal object of the invention is to enable the operator to control the speed of the vehicle engine in an easy, convenient manner until a certain predetermined rate of speed is attained, after which depressing of the accelerator pedal so as to further increase the speed of the vehicle will be relatively more difficult, that is to say, expenditure of a relatively greater effort will be required to depress the accelerator pedal after the predetermined rate of speed has been attained.

This object is achieved by the provision of a selective speed control device which is intended for association with the control of the carburetor of an internal combustion engine, this device including what may be referred to as an adjustment head conveniently mounted in the driver's compartment and provided with a speed adjustment indicator, matters being so arranged that the selector or adjuster head may be set with the reading of the indicator corresponding to a predetermined rate of speed at which the device becomes effective in resisting downward pressure upon the accelerator pedal.

It will be apparent from the foregoing that the primary advantage of the inveniton resides in the factor of safety which it provides, secondly in its ability to indicate to the driver that a predetermined speed has been attained, and thirdly, in providing in the form of the conventional accelerator pedal, a foot support for the driver, on which he may conveniently resist his foot when a predetermined speed has been attained.

A further advantage of the invention resides in its adaptability to convenient installation on the existing control linkage of the carburetors without the necessity of completely disassembling or changing the same.

An additional feature of the invention lies in its simplicity of construction and in its adaptability to motor vehicles of various types.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a side elevational view of the invention in association with the control linkage of the carburetor of an automobile engine, with a portion of the automobile being shown in section;

Figure 2 is a transverse, vertical section taken substantially along section line 2—2 of Figure 1 showing details of the mounting brackets and movable member;

Figure 3 is a side elevational detail view taken substantially along the reference line 3—3 of Figure 1 showing the adjustment or selector head with the indicator set at 40 miles per hour; and Figure 4 is a group side elevational view showing details of the speed control of this invention with the adjustment thereof broken away and shown in its relative position.

Referring now specifically to Figure 1 of the drawings, it will be seen that the numeral 10 generally designates the speed control of this invention mounted upon an internal combustion engine 12 having a carburetor 14 with a control bellcrank 16 for use in association with an automobile 18 having a dashboard 20, a floor board 22 and a fire wall 24, all of which is conventional structure found in the usual automobiles. Further, it will be seen that the floor board 22 has an accelerator pedal 26 pivotally mounted thereon by the usual pivot pin 28 and a control linkage 30 is connected to one arm of the bellcrank control 16 and a tension coil spring 32 maintains the accelerator pedal 26 in its upper or retracted position wherein the internal combustion engine will idle at a suitable speed with the operator's foot removed from the accelerator pedal 26. When the accelerator pedal 26 is depressed, it will be understood that the linkage 30 moves forwardly about a pivot pin 34 thereby pivoting the bellcrank 16 forwardly about its pivot pin.

Referring now specifically to Figure 4, it will be seen that the speed control 10 includes a pair of right angular brackets 36 having one leg thereof secured to the internal combustion engine 12 by suitable fastening means 38 and, as shown in Figure 2, a pair of right angular elongated members 40 are secured to the other leg of the right angular member 36 and upwardly projecting legs of the elongated right angular members 40 are spaced from each other and receive therebetween adjacent remote ends a pair of pivotal links 42 which are received between the upstanding legs of the elongated right angular members 40 and are pivoted thereto by pivot bolts 44. A second pair of elongated right angular members 46 are secured to the upper ends of the links 42 by pivot bolts 48 and an elongated member 50 is rigidly secured to the horizontal leg portions of the elongated right angular members 46. It will be seen that the links 42 are in parallel relationship at all times and the elongated members 40 and 46 along with the links 42 form the sides of a pinned parallelogram wherein the parallelogram may be adjusted thereby varying the angular relationships between the side links 42 and the elongated members 40 and 46. Further, it will be seen that the elongated members 46 will move in relation to the elongated members 40 and be in parallel position in all adjusted positions. The forward pivotal link 42 has an internally screw-threaded block 52 pivotally mounted thereon by a pivot bolt 54 and spaced therefrom by spacer member 56 and the internally threaded bore therein receives an externally threaded end portion 58 of adjustment rod 60. The elongated adjustment rod 60 passes upwardly through an aperture 62 in the fire wall 24 and is journaled in a mounting bracket 64 secured to the bottom of the dashboard 20 by a suitable bolt 66. The mounting bracket 64 has radially disposed indicia 68 thereon and an adjusting or operating knob 70 is secured to the remote end of the adjusting rod 60 and the knob 70 has a suitable indicating point 72 thereon and the knob also forms a surface 74 in engagement with the upper or indicia surface of the mounting bracket 64 thereby precluding longitudinal movement of the rod 60 in one direction. It will be seen that a projecting flange 76 is provided on the rod 60 on the opposite face of the mounting bracket 64 to preclude longitudinal movement of the rod 60 in the other direction therein imparting pushing or pulling movement to the forward link 42 upon rotation for angular adjustment of the operating knob and the rod 60.

Again referring specifically to Figure 4, it will be seen that the elongated plate 50 has an upturned forward end portion 78 having an aperture therein and the rear end portion of the plate 50 is provided with a detachable right angular member 80 with an aperture therein and a projecting sleeve 82 rigid therewith and having internal threads for threadably receiving an externally threaded adjustment sleeve 84. The right angular member 80 is secured to the plate 50 by suitable fastening means 86. The upstanding members 78 and 80 slidably receive an elongated rod 88 having an enlarged head portion 90 at one end thereof and an abutment washer 92 secured to the rod in spaced relation to the enlarged head 90 with the enlarged head 90 on one side of the upstanding member 78 and the washer 92 on the opposite side of the upstanding member 78. A compression coil spring 94 is positioned around the rod 88 and abuts the stop washer 92 at one end thereof and abuts the enlarged end portion 96 on the threaded sleeve 84 at its other end. It will be understood that by manipulation of the stop member 96 the tension of the spring 94 may be adjusted. The enlarged head 90 lies in the path of movement of the bellcrank control and specifically lies in the path of movement of the arm extending at right angles to the arm to which the control linkage 30 is attached. Upon actuation of the accelerator 26 and the control linkage 30 the bellcrank 16 pivots about its axis bringing the arm of the bellcrank into contact with the enlarged head 90 wherein the accelerator pedal must be pushed down with more force to overcome the tension of the spring 94 in order to increase the speed of the vehicle above a predetermined point.

By manipulation of the operator knob 70, the rod 60 is rotated thereby imparting motion to the forward pivotal link 42 wherein the links 42 pivot about the pivot bolts 44 and 48 thereby moving the plate 50 in relation to the brackets 36 and adjusting the point of contact between the enlarged head 90 and the bellcrank control 16. Obviously, the indicator 72 may be set on suitable indicia 68 and the vehicle speed may be easily set at a predetermined position. When it is desired to increase the speed above the predetermined setting, the accelerator pedal 26 may be pushed down thereby overcoming the tension of the spring 94 and moving the enlarged head 90 and the rod 88 telescopically through the upstanding members 78 and 80 and it will be understood that by adjusting the tension of the spring 94 by manipulation of the threaded sleeve 84 and the stop member 96, the accelerator pedal may be used substantially as a footrest while operating the vehicle at its predetermined speed. Obviously, the various components of the device may be made of readily obtainable material thereby enhancing the economic feasibility of the device and the particular construction may be changes to readily adapt itself to various types of vehicles wherein the speed control includes a pivotal member such as the bellcrank 16.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claims.

What is claimed as new is as follows:

1. A speed control device for use in association with a bellcrank carburetor control member and an accelerator pedal comprising a bracket adapted to be supported adjacent the carburetor, an elongated member adjustably secured to said bracket, a yielding abutment member mounted on said elongated member and adapted to engage said control member at a predetermined point of its movement, and means for remotely adjusting said elongated member to determine the point of contact between the abutment and the control means, said bracket and elongated member being interconnected by a pair of parallel pivot links, one of said links having an internally screw-threaded bore, and said adjusting means includes a rod having a screw threaded end in engagement with said bore, an operating knob on the other end of said rod, a mounting bracket journalling said rod for rotation and precluding longitudinal movement wherein movement of said knob adjusts said elongated member in relation to said bracket, said elongated member including a pair of upstanding lugs in spaced relation, an aperture in each lug, said abutment including a rod having a shank and an enlarged head, said shank slidably positioned in said apertures, a coil spring surrounding said shank, a stop secured to said shank in spaced relation to said head, said spring disposed between said stop and the lug remote from said head wherein said abutment is urged outwardly in relation to the other of said lugs.

2. The structure as defined in claim 1 wherein said adjusting rod mounting bracket includes radially disposed indicia, and said knob includes a pointer for indicating the selected point of contact between said abutment and the bellcrank control.

References Cited in the file of this patent

UNITED STATES PATENTS

| | | |
|---|---|---|
| 1,172,437 | Crothers | Feb. 22, 1916 |
| 1,239,236 | Voight | Sept. 4, 1917 |
| 1,444,185 | Hiatt | Feb. 6, 1923 |
| 1,701,847 | Hedges | Feb. 12, 1929 |
| 1,759,355 | Kampman | May 30, 1930 |
| 1,880,456 | Moorhouse | Oct. 4, 1932 |
| 2,118,730 | Kalbreier | May 24, 1938 |
| 2,295,897 | Gillespie | Sept. 15, 1942 |